(12) United States Patent
Katakura et al.

(10) Patent No.: US 8,202,199 B2
(45) Date of Patent: Jun. 19, 2012

(54) RAPID ACCELERATION CONTROL APPARATUS

(75) Inventors: Shusaku Katakura, Fujisawa (JP);
Kazuhiro Taniai, Kokubunji (JP);
Masami Murayama, Yokohama (JP);
Yoshinobu Kawamoto, Atsugi (JP);
Youhei Mizuta, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 887 days.

(21) Appl. No.: 12/271,151

(22) Filed: Nov. 14, 2008

(65) Prior Publication Data

US 2009/0143195 A1   Jun. 4, 2009

(30) Foreign Application Priority Data

Dec. 3, 2007 (JP) .................. 2007-312088

(51) Int. Cl.
*F16D 48/08* (2006.01)
*B60W 10/02* (2006.01)
(52) U.S. Cl. ........................ 477/171; 477/180
(58) Field of Classification Search .................. 477/171, 477/173, 174, 180
See application file for complete search history.

(56) References Cited

U.S. PATENT DOCUMENTS

| 4,817,776 | A | 4/1989 | Tateno et al. | |
|---|---|---|---|---|
| 2002/0065170 | A1* | 5/2002 | Suzuki | 477/171 |
| 2003/0092530 | A1* | 5/2003 | Schwab et al. | 477/171 |

FOREIGN PATENT DOCUMENTS

| JP | 59-118534 | 7/1984 |
|---|---|---|
| JP | 62-056445 | 4/1987 |
| JP | S64-021026 U | 2/1989 |
| JP | 01-113531 | 5/1989 |
| JP | 03-125030 | 5/1991 |
| JP | 07-077078 | 3/1995 |
| JP | 08-058434 | 3/1996 |
| JP | 2002-257161 | 9/2002 |
| JP | 2005-324730 | 11/2005 |
| JP | 2007-176430 | 7/2007 |

OTHER PUBLICATIONS

An English translation of the Japanese Office Action of corresponding Japanese Application No. JP 2007-312088, dated Dec. 9, 2011, mailed Dec. 13, 2011.
The Japanese Office Action of corresponding Japanese Application No. 2007-312088, dated Sep. 22, 2011 and mailed Sep. 27, 2011.

* cited by examiner

*Primary Examiner* — Edwin A Young
(74) *Attorney, Agent, or Firm* — Global IP Counselors, LLP

(57) ABSTRACT

A rapid acceleration control apparatus has a rapid acceleration prime mover rotational speed control section and a rapid acceleration start clutch capacity control section. The rapid acceleration prime mover rotational speed control section executes a rapid acceleration start prime mover rotational speed control that control a rotational speed of the prime mover to a target rotational speed required to achieve the rapid acceleration start when a rapid acceleration start condition exists in which both an accelerator and a brake are simultaneously operated while the vehicle is stopped. The rapid acceleration start clutch capacity control section executes a rapid acceleration start clutch capacity control that decreases a connection capacity of the clutch during the rapid acceleration start prime mover rotational speed control executed by the rapid acceleration prime mover rotational speed control section to suppress heating of the clutch due to the rapid acceleration start primer mover rotational speed control.

10 Claims, 13 Drawing Sheets

RAPID ACCELERATION CONTROL APPARATUS

CROSS-REFERENCE TO RELATED APPLICATIONS

This application claims priority to Japanese Patent Application No. 2007-312088, filed on Dec. 3, 2007. The entire disclosure of Japanese Patent Application No. 2007-312088 is hereby incorporated herein by reference.

BACKGROUND OF THE INVENTION

1. Field of the Invention

The present invention generally relates all types of transmissions, including manual transmissions configured to be shifted manually, continuously variable automatic transmissions, standard step-shifting automatic transmissions, and automatic manual transmissions (which are manual transmissions provided with automatic shifting capability). More specifically, the present invention particularly relates to a rapid acceleration control apparatus that automatically controls a connection capacity of a starting clutch for transmitting rotation from an engine or other prime mover through the to a selected gear train.

2. Background Information

A rapid acceleration start of a vehicle refers to a driving operation in which, for example, an accelerator pedal of the vehicle is depressed and the engine speed is increased above an idling speed while the vehicle remains stopped due to actuation of a brake device and then the brake device is released (put into a non-actuated state) such that vehicle starts into motion.

In transmissions in which the engine rotation is inputted through a torque converter or other hydraulic power transmission device, e.g., step-shifting and continuously variable automatic transmissions, when the aforementioned rapid acceleration start operation is executed while the vehicle is stopped, the increased (faster) rotation of the engine is transmitted to the selected gear train of the transmission through the hydraulic fluid. However, in such a case, the selected gear train cannot rotate because the vehicle is stopped. Consequently, it is difficult to raise the engine speed to a rotational speed requested by the rapid acceleration start operation. Also it is difficult to obtain a motion starting response in accordance with what is requested by the rapid acceleration start operation.

Consequently, regardless of which type of transmission is used, when it comes to receiving the rotational input from the engine, it is advantageous to use a motion starting clutch and control the connection capacity thereof instead of using a torque converter or other hydraulic power transmission device.

Japanese Laid-Open Patent Publication No. 64-021026 discloses a control technology related to a situation in which an accelerator pedal of a vehicle is depressed while a brake device of the vehicle is actuated. Although the technology is not specifically intended for a vehicle installed with a transmission having a capacity-controllable motion starting clutch arranged in a power transmission path, it is a technology for allowing a drive force to be increased in accordance with a depression operation of the accelerator pedal upon determining that there is a request for a drive force while the brake device is actuated.

SUMMARY OF THE INVENTION

If a control technology allows a drive force to a starting clutch to be increased in accordance with the accelerator operation while the brake device is actuated, then the starting clutch will slip and generate an increased amount of heat due to the increased drive force. This could then result in sudden failure of the starting clutch due to heat damage, and thus making it impossible for the vehicle to start into motion.

In view of the state of the known technology, one object of the present invention is to provide a rapid acceleration control apparatus for controlling a connection capacity of a starting clutch that reduces the heating problem of the starting clutch by executing rotational speed control of the prime mover and a torque capacity control of the starting clutch.

According to one aspect, a rapid acceleration control apparatus for a vehicle is provided that basically comprises a prime mover rotational speed control section, a clutch connection capacity control section, a rapid acceleration request determining section, a rapid acceleration prime mover rotational speed control section and a rapid acceleration start clutch capacity control section. The prime mover rotational speed control section is configured to control a rotational speed of a prime mover. The clutch connection capacity control section is configured to control connection capacity of a clutch arranged between the prime mover and a wheel. The rapid acceleration request determining section is configured to determine a rapid acceleration start condition exists when both an accelerator and a brake are simultaneously operated while the vehicle is stopped. The rapid acceleration prime mover rotational speed control section is configured to execute a rapid acceleration start prime mover rotational speed control that control a rotational speed of the prime mover to a target rotational speed required to achieve the rapid acceleration start when the rapid acceleration request determining section has determined that the rapid acceleration start condition exists. The rapid acceleration start clutch capacity control section is configured to execute a rapid acceleration start clutch capacity control that decreases a connection capacity of the clutch during the rapid acceleration start prime mover rotational speed control executed by the rapid acceleration prime mover rotational speed control section to suppress heating of the clutch due to the rapid acceleration start primer mover rotational speed control.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
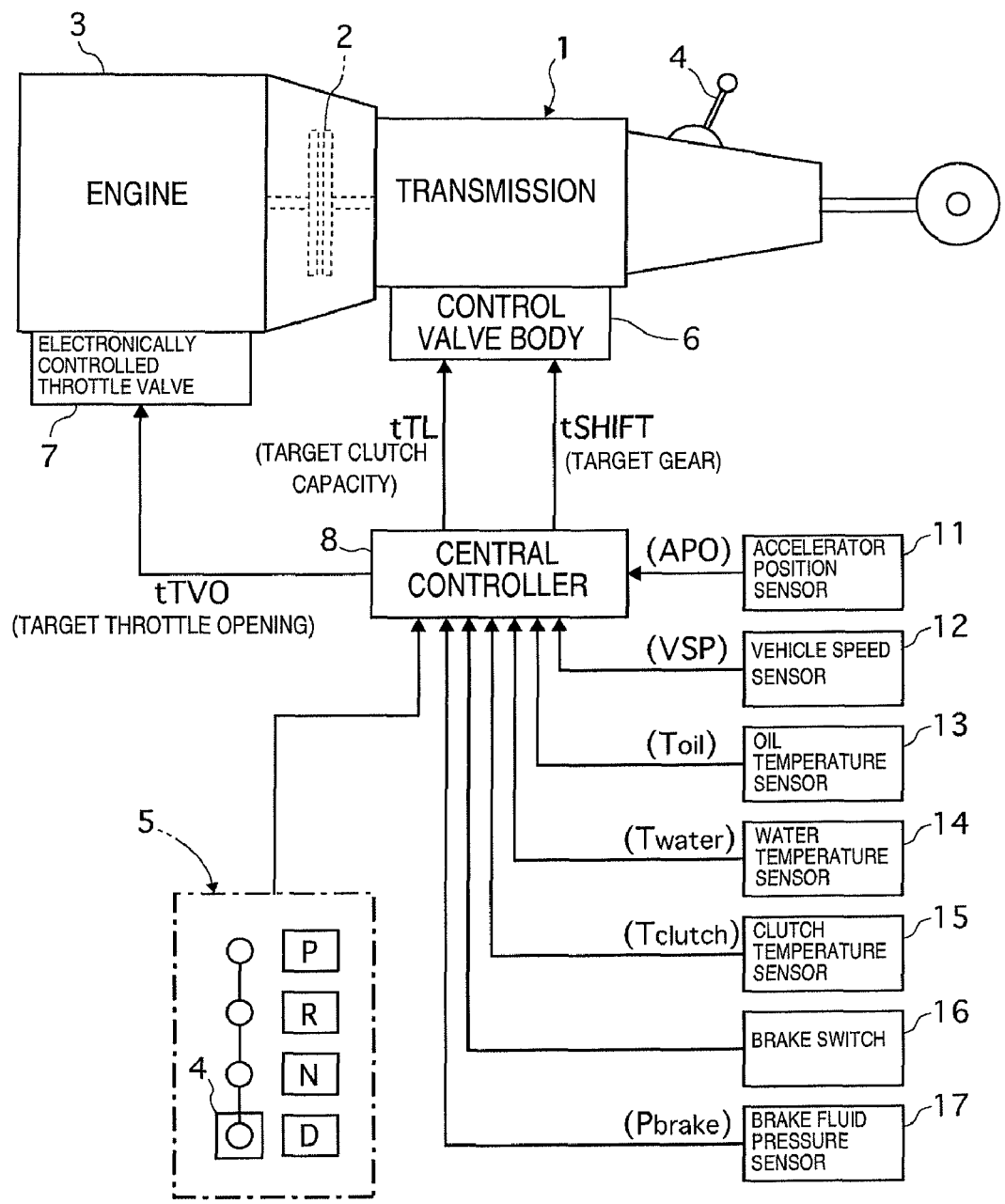
FIG. 1 is a schematic system diagram of a control system of a vehicle that is equipped with a transmission having a capacity-controllable motion starting clutch and a rapid acceleration control apparatus.

Referring initially to FIG. 1, a control system of a vehicle is illustrated that is equipped with a transmission 1 having a capacity-controllable motion starting clutch 2 and a rapid acceleration control apparatus in accordance with one embodiment. The transmission 1 can be a step-shifting or a continuously variable transmission, a manual transmission, or another type of transmission. Rotation of an engine 3 (e.g., a prime mover) is inputted to the leftward end (leftward of FIG. 1) of the transmission through the starting clutch 2. The transmission 1 converts the rotation in accordance with a selected gear and outputs the rotation from the rightward end thereof (rightward of FIG. 1). The output rotation is distributed toward a pair of front wheels (not shown) and a pair of rear wheels 9 (only one shown) by a transfer case (not shown) and passes through a front wheel differential gear and a rear wheel differential gear before reaching the front and rear wheels of the, respectively.

In the illustrated embodiment, the transmission 1 is configured such that the gear (gear ratio) of the transmission 1 can be set automatically, including the gear used when starting the vehicle into motion. Consequently, the transmission 1 is equipped with a shift lever 4 for selecting a shift mode. The shift lever 4 is positioned near a driver's seat and arranged to pass through a floor tunnel (not shown) of the vehicle body. The shift lever 4 is manually operated in accordance with an operating pattern 5.

The operating pattern 5 of the shift lever 4 has a P range position for setting the transmission 1 into a parking (P) range, an R range position for setting the transmission 1 into a reverse (R) range, an N range position for setting the transmission 1 into a neutral (N) range, and a D range position for setting the transmission 1 into a forward automatic-shifting drive (D) range. The P range position, the R range position, the N range position, and the D range position are arranged along a straight line and the operating pattern 5 is configured to detect which position the shift lever 4 is in and output a signal indicating the selected range.

The starting clutch 2 is a capacity-controllable motion starting clutch that is configured such that a connection capacity of the starting clutch 2 can be automatically controlled. The connection capacity control (connection and release control) of the starting clutch 2 and the automatic shift control of the transmission 1 are accomplished with a control valve body 6.

The output of the engine 3 is increased and decreased by controlling an opening degree of an electronically controlled throttle valve 7. A central controller 8 controls the opening degree control of the throttle valve 7 (engine output control), the connection capacity control of the starting clutch 2 through the control valve body 6, and the shift control of the transmission 1 through the control valve body 6.

Various control signals are fed to the central controller 8. A selected range signal is sent to the central controller 8 from the operating pattern 5 in which the selected range signal is indicative of the position of the shift lever 4. An accelerator signal is sent to the central controller 8 from an accelerator position sensor 11 serving to detect an accelerator position APO (i.e., an accelerator pedal depression amount). A vehicle speed sensor signal is sent to the central controller 8 from a vehicle speed sensor 12 serving to detect a vehicle speed VSP. An oil temperature signal is sent to the central controller 8 from an oil temperature sensor 13 serving to detect a transmission operating oil temperature Toil. A water temperature signal is sent to the central controller 8 from a water temperature sensor 14 serving to detect an engine coolant temperature Twater. A clutch temperature signal is sent to the central controller 8 from a clutch temperature sensor 15 serving to detect a temperature Tclutch of the starting clutch 2. A brake pedal depression signal is sent to the central controller 8 from a brake switch 16 configured to turn ON when a brake pedal is depressed. A brake pressure signal is sent to the central controller 8 from a brake pressure sensor 17 serving to detect a brake fluid pressure Pbrake that expresses an actuation amount of a brake device.

The manner in which central controller 8 executes connection capacity control of the starting clutch 2 through the control valve body 6, the shift control of the transmission through the control valve body 6, and the output control of the engine through the electronically controlled throttle valve 7 will now be explained.

First, the connection capacity control of the starting clutch 2 and the shift control of the transmission 1 will be explained in a brief fashion. When the shift lever 4 is put into the D range position, the central controller 8 determines a target gear tSHIFT that is desirable under the current driving conditions based on the vehicle speed VSP, the accelerator opening APO and a shift map. The central controller 8 then controls the control valve body 6 such that the gear train corresponding to the target gear tSHIFT is selected inside the transmission 1.

When the shift lever 4 is put into the R range position, the central controller 8 sets a reverse gear as the target gear tSHIFT and controls the control valve body 6 such that the gear train corresponding to the target gear tSHIFT (=reverse gear) is selected inside the transmission 1.

When the shift lever 4 is put into the N range position, the central controller 8 sets the target gear tSHIFT to neutral and controls the control valve body 6 such that the transmission 1 enters a neutral state in which none of the gears inside the transmission 1 are able to transmit power.

When the shift lever 4 is put into the P range position, similarly to when the N range is selected, the central controller 8 sets the target gear tSHIFT to neutral and controls the control valve body 6 such that the transmission 1 enters a neutral state in which none of the gears inside the transmission 1 are able to transmit power.

Additionally, in the P range, the shift lever 4 actuates a park lock device by means of a mechanical link mechanism, thereby locking the transmission output shaft such that it cannot rotate.

When the vehicle is started into motion in the selected motion starting gear (first gear or reverse), the starting clutch 2 is connected in a slipping fashion and the connection capacity thereof is increased from 0 such that the power is transmitted smoothly and the vehicle starts into motion smoothly without experiencing a shock.

When the transmission changes gears (speeds) while in the D range, the connection capacity of the starting clutch 2 is controlled such that the starting clutch 2 operates similarly to the way a clutch of a manual transmission is operated when the manual transmission is shifted by a driver. Otherwise, the starting clutch 2 is either fully connected or fully released in accordance with the selected range, selected gear, and the traveling state of the vehicle. The central controller 8 controls the connection capacity of the starting clutch 2 (including during connection and release) through the control valve body 6 by issuing a target clutch capacity tTL to the control valve body 6.

The central controller 8 determines a target throttle opening degree tTVO of the electronically controlled throttle valve 7 to correspond to the accelerator position APO and issues the target throttle opening tTVO as a command to the electronically controlled throttle valve 7. During rapid acceleration start control, the central controller 8 can set the target throttle opening tTVO to be larger or smaller than the opening degree corresponding to the accelerator position APO, and thus can increase and decrease the engine output independently of the accelerator position APO.

In addition to the general shift control, the starting clutch connection capacity control, and the throttle opening (engine) control mentioned above, the central controller 8 also executes the control programs shown in FIGS. 2 to 8 in order to accomplish the rapid acceleration start control intended by the present invention.

Figure 2:
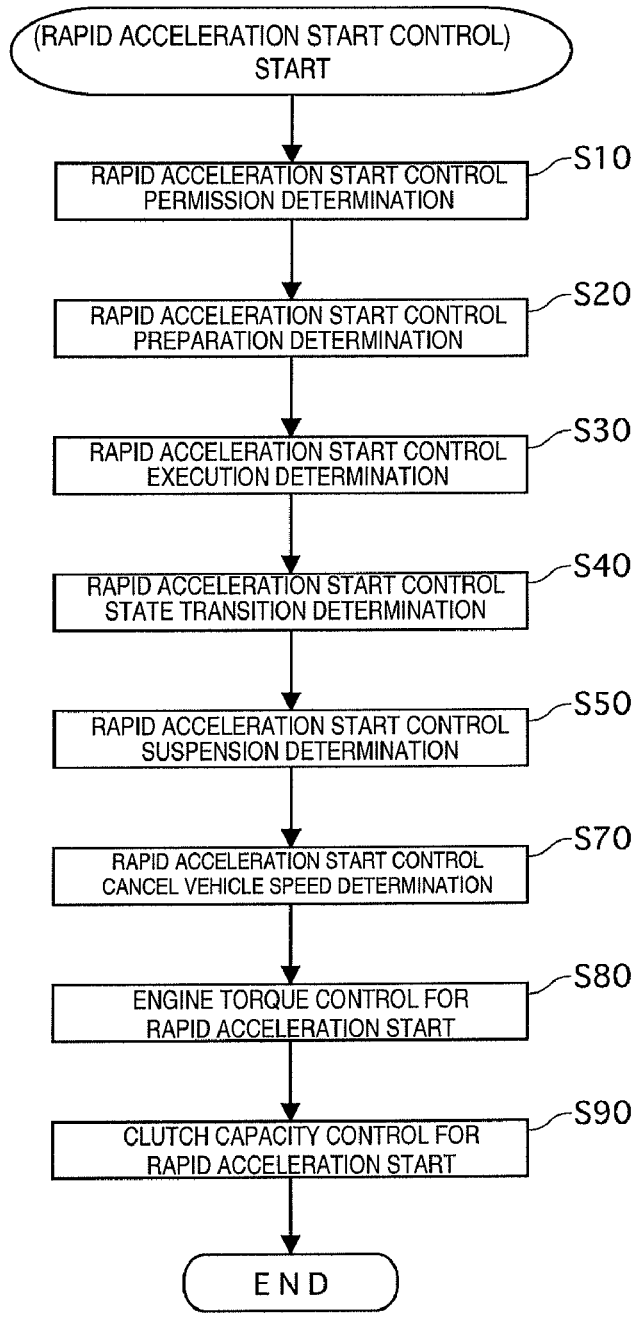
FIG. 2 is a flowchart showing a main routine of a rapid acceleration start control program executed by a central controller of the control system shown in FIG. 1.

FIG. 2 shows a main routine. In step S10 of the main routine, the central controller 8 executes a rapid acceleration start control permission determination to determine if a rapid acceleration start control can be executed. The rapid acceleration start control permission determination is accomplished by executing the process shown in FIG. 3 to determine if the vehicle is in a state in which rapid acceleration start control can be executed.

In step S11, the central controller 8 checks if the selected gear is a rapid acceleration start control permissible gear position, i.e., if the transmission is in a forward motion starting gear.

In step S12, the central controller 8 determines if the transmission operating oil temperature Toil is within a rapid acceleration start control permissible range, i.e., in a low temperature region where it is permissible to execute the rapid acceleration start control.

In step S13, the central controller 8 checks if the clutch temperature Tclutch is within a rapid acceleration start control permissible range, i.e., in a low temperature region where it is permissible to execute the rapid acceleration start control.

In step S14, the central controller 8 checks if the engine coolant temperature Twater is within a rapid acceleration start control permissible range, i.e., in a low temperature region where it is permissible to execute the rapid acceleration start control.

In step S15, the central controller 8 checks if the engine control system is operating normally.

In step S16, the central controller 8 checks if the transmission control system is operating normally.

In step S17, the central controller 8 checks if a transfer case for four-wheel drive is operating normally.

If the results of steps S11 to S17 are all Yes, then in step S18 the central controller 8 sets a rapid acceleration start control permission flag, thereby permitting rapid acceleration start control.

If the result of any of the steps S11 to step S17 is No, then the central controller 8 proceeds to step S19 and clears the rapid acceleration start control permission flag, thereby prohibiting rapid acceleration start control.

In step S20 of FIG. 2, the central controller 8 executes a rapid acceleration start control preparation determination to determine if a preparatory condition for rapid acceleration start control is satisfied.

Figure 4:
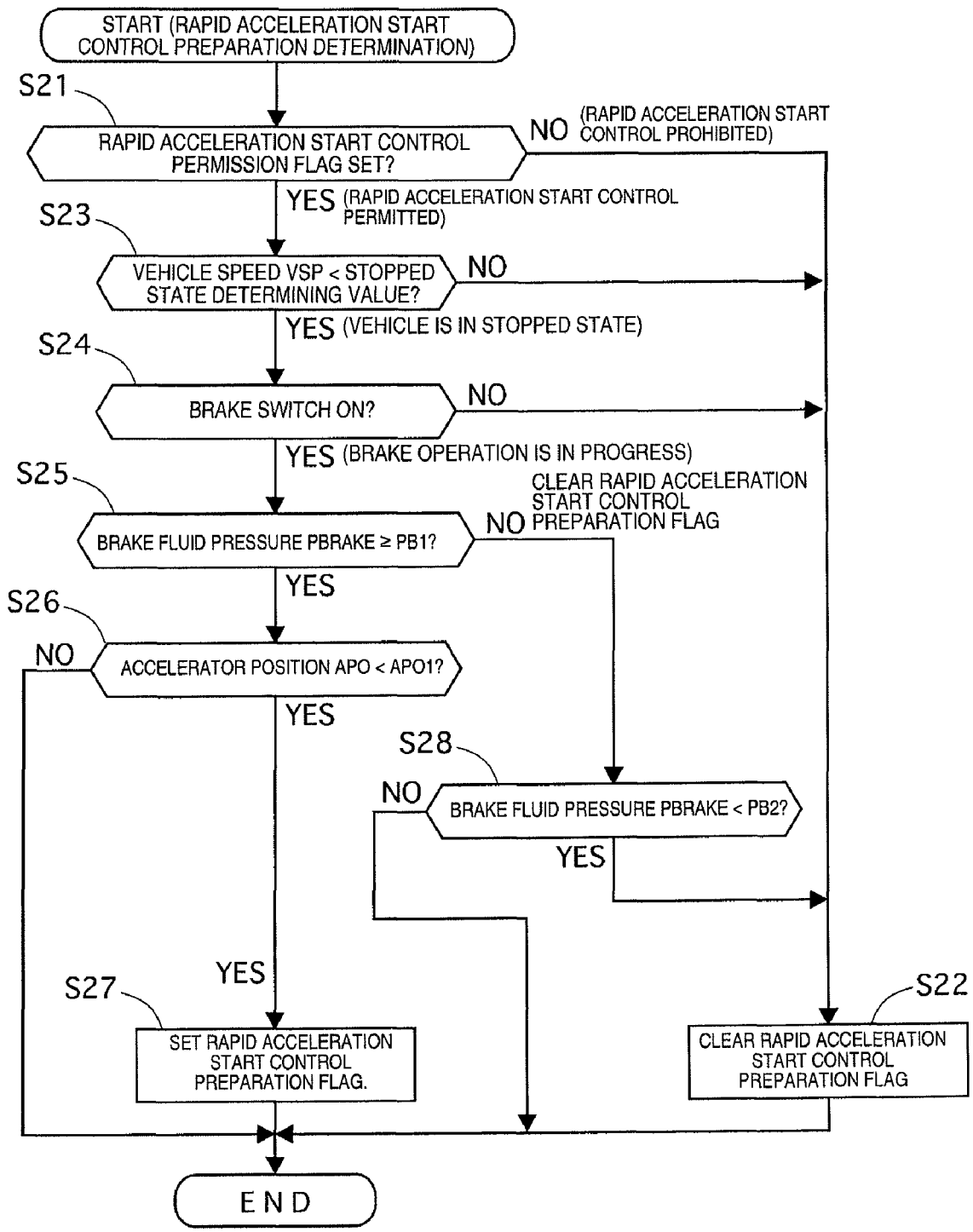
FIG. 4 is a flowchart showing a subroutine related to a rapid acceleration start control preparation determination step of the main routine shown in FIG. 2.

The rapid acceleration start control preparation determination is accomplished by executing the steps shown in FIG. 4 to determine if the vehicle is in a state in which it is likely that a driver will perform a rapid acceleration start control request operation. If so, then the rapid acceleration start control preparatory condition is determined to be satisfied.

Figure 3:
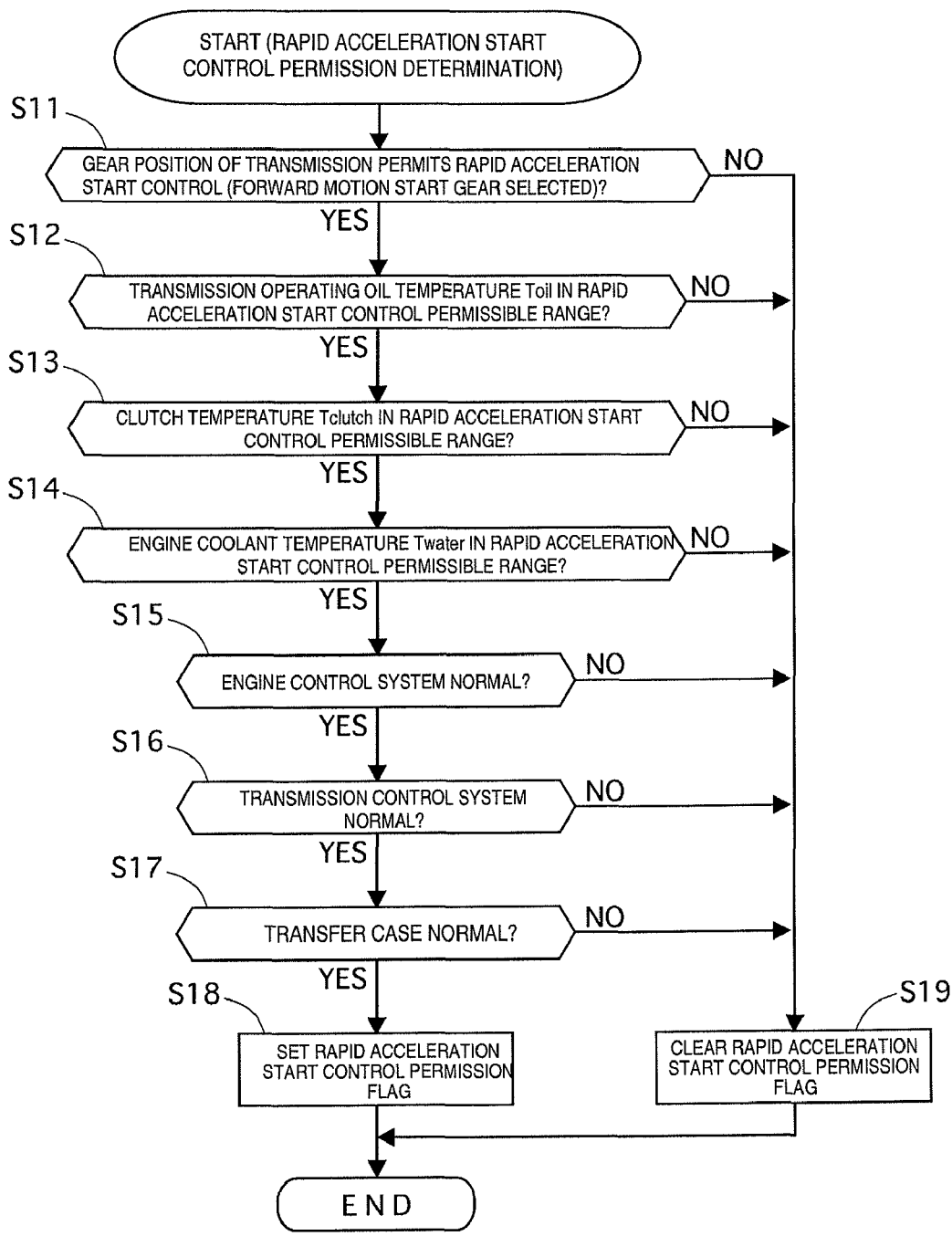
FIG. 3 is a flowchart showing a subroutine related to a rapid acceleration start control permission determination step of the main routine shown in FIG. 2.

In step S21, the central controller 8 checks if the rapid acceleration start control permission flag set or cleared in the flowchart of FIG. 3 is in a set state.

If the rapid acceleration start control permission flag is not set, then control proceeds to step S22 because the rapid acceleration start control is not permitted. In step S22, the central controller 8 clears a rapid acceleration start control preparation flag to indicate that the preparatory condition for executing the rapid acceleration start control is still not satisfied.

If it is determined in step S21 that the rapid acceleration start control permission flag is set, then control proceeds to step S23 and subsequent steps in which the central controller 8 determines if the preparatory condition for rapid acceleration start control is satisfied based on whether or not a condition exists under which it is likely that the driver will perform a rapid acceleration start control request operation.

In step S23, the central controller 8 determines if the vehicle is in a stopped state by determining if the vehicle speed VSP is below a stopped state determining value. If the vehicle is not in a stopped state, then the central controller 8 determines that the driver will not perform a rapid acceleration start request operation and clears the rapid acceleration start control preparation flag in step S22.

If it determines in step S23 that the vehicle speed VSP is below the stopped state determining value, i.e., that the vehicle is in a stopped state, then the central controller 8 proceeds to step S24 and determines if a driver brake operation is being performed by determining if a brake switch 16 is ON. If a driver brake operation is not being performed, then the central controller 8 determines that the driver will not perform a rapid acceleration start request operation and clears the rapid acceleration start control preparation flag in step S22.

If it determines in step S24 that the brake switch 16 is ON and a brake operation is in progress, then the central controller 8 proceeds to step S25 and checks if a brake device is being actuated (i.e., if braking is in progress) by determining if a brake fluid pressure Pbrake is equal to or larger than a first set value Pb1. If the brake fluid pressure Pbrake is equal to or larger than a first set value Pb1 (i.e., Pbrake≧Pb1), then the central controller 8 proceeds to step S26 and determines if the accelerator position APO is smaller than a first set value APO1.

If the results of all of steps S23 to S26 are Yes, then the central controller 8 proceeds to step S27 and sets the rapid acceleration start control preparation flag. This corresponds to a time t2 in the rapid acceleration start control time chart shown in FIG. 11, which is the moment when the conditions of those steps are all determined to be satisfied after a time t1 when the brake operation occurred.

The rapid acceleration start control preparation flag is set when it is determined that the conditions described above are satisfied and it is likely that the driver will perform a rapid acceleration start control request operation, i.e., that a preparatory condition for the rapid acceleration start control is satisfied. When the rapid acceleration start control preparation flag is set, rapid acceleration start control is permitted.

Figure 11:
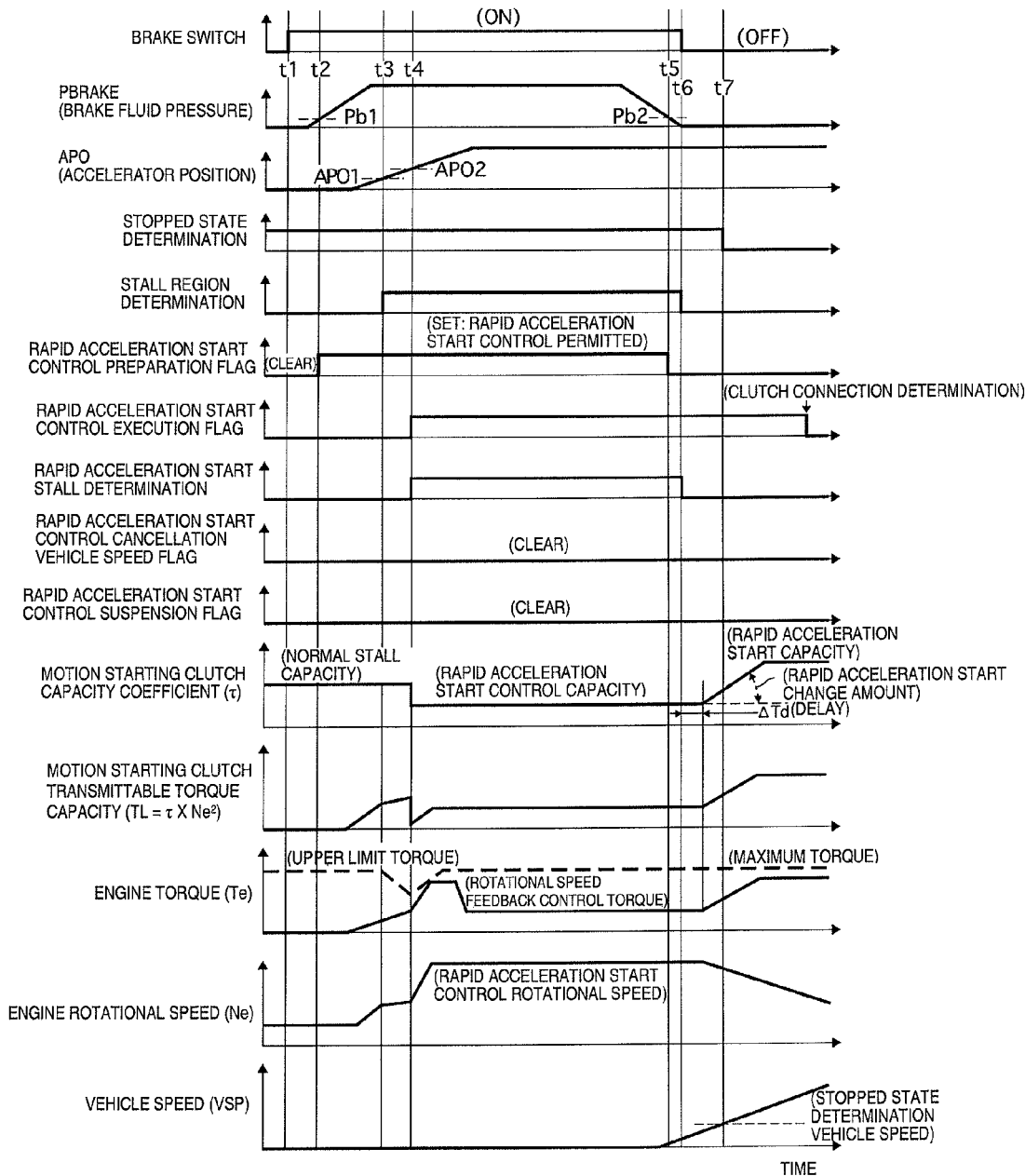
FIG. 11 is an operation time chart illustrating a normal operation of the rapid acceleration start control presented in FIGS. 2 to 9.

In the example shown in FIG. 11, the accelerator position APO increases due to depression of the accelerator pedal (which is a rapid acceleration start request operation) at a time t3 such that APO becomes equal to or larger than APO1. Consequently, control skips step S27 after step S26 and ends the control loop shown in FIG. 4. After the time t3 when APO becomes equal to or larger than APO1, the rapid acceleration start control preparation flag continues to be set and the rapid acceleration start control is permitted.

When it determines in step S25 that the brake fluid pressure Pbrake is no longer equal to or larger than the first set value Pb1, the central controller 8 proceeds to step S28 and compares the brake fluid pressure Pbrake to a second set value Pb2 that is smaller than the first set value Pb1 by an amount serving to compensate for hysteresis. By determining if the brake fluid pressure is smaller than the second set value Pb2, the central controller 8 determines if the brake device is in a non-actuated state.

At a time t5 in FIG. 11, the brake fluid pressure Pbrake falls below the second set value Pb2 and control proceeds from step S28 to S22. The central controller 8 determines that the brake device has entered a non-actuated state and that a rapid acceleration start control request operation is no longer being performed. Thus, at the time t5 in FIG. 11, the central controller 8 clears the rapid acceleration start preparation flag and prohibits the rapid acceleration start control.

However, until the brake fluid pressure falls below the second set value Pb2 at the time t5 of FIG. 11, the central controller 8 skips step S33 after step S28 and ends the control loop of FIG. 4, thereby keeping the rapid acceleration start control preparation flag in a set state and permitting the rapid acceleration start control.

In step S30 of FIG. 2, the central controller 8 executes a rapid acceleration start control execution determination to determine if a rapid acceleration start condition exists for executing the rapid acceleration start control.

Figure 5:
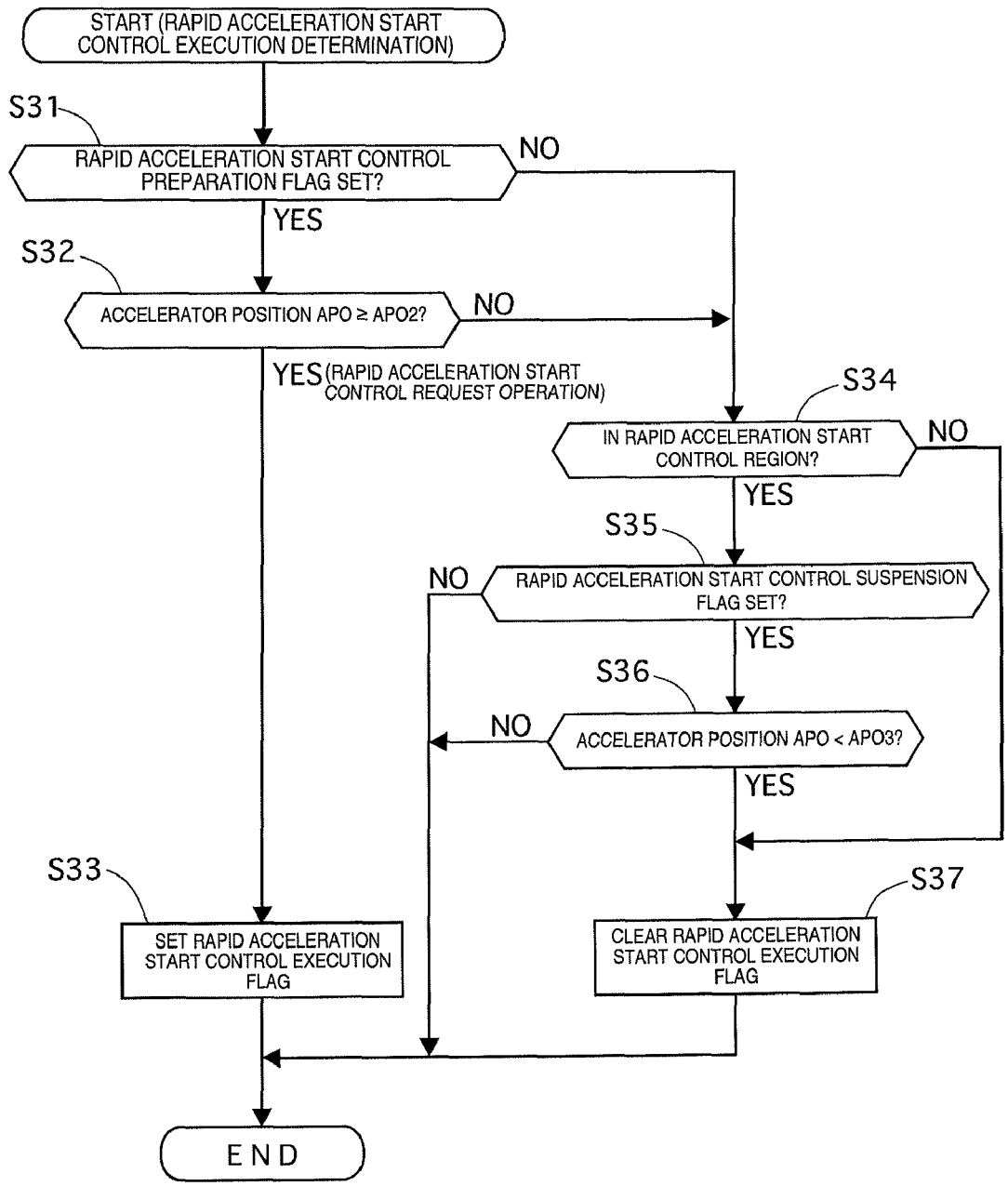
FIG. 5 is a flowchart showing a subroutine related to a rapid acceleration start control execution determination step of the main routine shown in FIG. 2.

The rapid acceleration start control execution determination is accomplished as shown in FIG. 5. In short, the central controller 8 determines if the condition for executing rapid acceleration start control is satisfied by determining if the driver has performed a rapid acceleration start control request operation.

In step S31, the central controller 8 checks if the rapid acceleration start control preparation flag set or cleared in the flowchart of FIG. 4 is in a set state.

If the rapid acceleration start control preparation flag is set, then the central controller 8 determines that the preparatory conditions for executing the rapid acceleration start control are satisfied such that the rapid acceleration start control is permitted and proceeds to step S32. In step S32, the central controller 8 checks if the driver has performed a rapid acceleration start control request operation by determining if the accelerator position APO is equal to or larger than a second set value APO2 that is larger than the first set value APO1.

In FIG. 11, the accelerator position APO becomes equal to or larger than the second set value APO2 at a time t4. At the time t4, the central controller 8 proceeds from step S32 to step S33 and sets a rapid acceleration start execution flag as shown in FIG. 11, thereby commanding execution of the rapid acceleration start control.

When conditions are such that it is determined in step S31 that the rapid acceleration start control preparation flag is not set or determined in step S32 that the accelerator position APO has not reached the second set value APO2 (i.e., before the time t4 in FIG. 11), then the central controller 8 sequentially executes the determination steps S34 to S36.

In step S34, the central controller 8 checks if the vehicle is in a rapid acceleration start control region. In step S35 the central controller 8 checks if a rapid acceleration start control suspension flag (explained later) is set. In step S36 the central controller 8 checks if the accelerator position APO is smaller than a third set value APO3 for determining if execution of the rapid acceleration start control is no longer permitted.

If in step S34 the vehicle is determined not to be in the rapid acceleration start control region, then the central controller 8 proceeds to step S37 where it clears the rapid acceleration start control execution flag, thereby stopping the command for execution of the rapid acceleration start control. Similarly, even if it determines in step S34 that the vehicle is in the rapid acceleration start control region, the central controller 8 proceeds to step S37 and commands execution of the rapid acceleration start control if it determines in step S35 that the rapid acceleration start control suspension flag is set (i.e., that a rapid acceleration start control suspension command state exists) and in step S36 that the accelerator position APO is smaller than the third set value APO3 (rapid acceleration start control execution prohibition opening degree).

After determining in step S34 that the vehicle is in the rapid acceleration start control region, the central controller 8 skips step S37 and ends the control loop of FIG. 5 if it determines in step S35 that the rapid acceleration start control suspension flag is not set (i.e. that the rapid acceleration start control suspension command state does not exist) or if it determines in step S36 that the accelerator position APO is not smaller than the third set value APO3 (rapid acceleration start control execution prohibition opening degree). By ending the control loop, the central controller 8 keeps the rapid acceleration start control execution flag in the set state achieved in step S33 and continues to command the execution of the rapid acceleration start control.

In step S40 of FIG. 2, the central controller 8 executes a rapid acceleration start control state transition determination to determine if a rotational speed control of the engine 3 should be executed to accomplish the rapid acceleration start control or if a torque control of the engine 3 should be executed to transition to a normal control.

Figure 6:
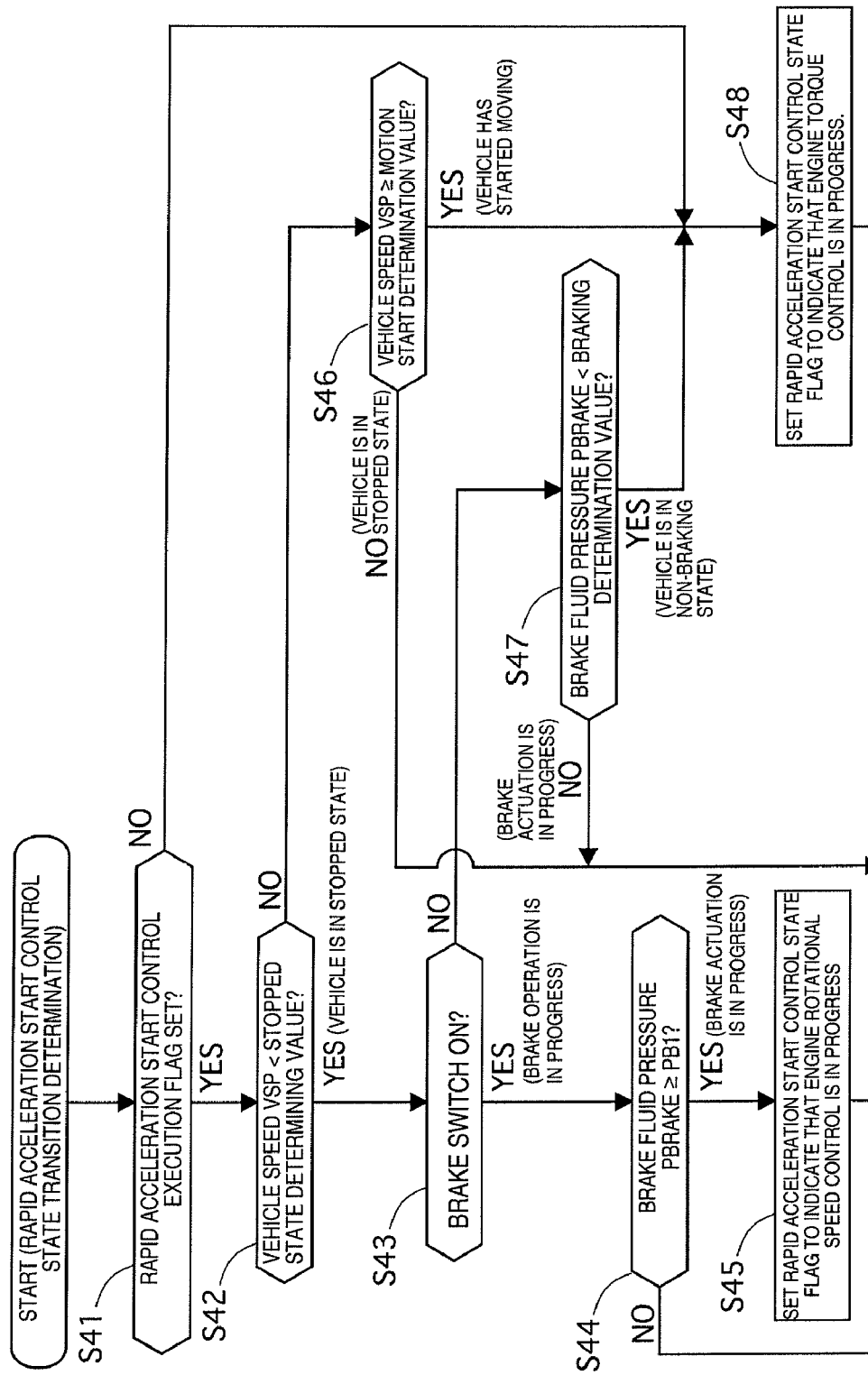
FIG. 6 is a flowchart showing a subroutine related to a rapid acceleration start control state transition determination step of the main routine shown in FIG. 2.

The rapid acceleration start control state transition determination is accomplished by executing the steps shown in FIG. 6. In step S41, the central controller 8 checks if the rapid acceleration start control execution flag that was set or cleared in the control loop of FIG. 5 is set.

If the rapid acceleration start execution flag is set, then execution of the rapid acceleration start control is being commanded and the central controller 8 proceeds to steps S42 to S44 to determine if the rotational speed control of the engine 3 should be executed so as to accomplish the rapid acceleration start control.

In step S42, the central controller 8 checks if the vehicle speed VSP is smaller than the stopped state determining value, i.e., if the vehicle is in a stopped state. In step S43, the central controller 8 checks if the brake switch 16 is ON, i.e., if a brake operation is in progress. In step S44, the central controller 8 checks if the brake fluid pressure Pbrake is equal to or larger than the first set value Pb1 (i.e., if braking is in progress).

If the results of steps S42 to S44 are all Yes, then the central controller 8 determines that rotational speed control of the engine 3 should be executed to accomplish rapid acceleration start control and proceeds to step S45 where it sets a rapid acceleration start control state flag to indicate that rotational speed control of the engine 3 is in progress.

Thus, so long as the brake fluid pressure Pbrake is determined to be smaller than the first set value Pb1 in step S44, the rapid acceleration start control state flag will be kept in the same state by ending the control loop of FIG. 6 after step S44. Only when all three of the conditions explained above are satisfied will the rapid acceleration start control state flag be set so as to indicate that rotational speed control of the engine 3 is in progress. Conversely, after the rapid acceleration start control state flag is set to indicate that rotational speed control of the engine 3 is in progress, the rapid acceleration start control state flag is kept at the value indicating that rotational speed control of the engine 3 is in progress even if the brake fluid pressure Pbrake becomes smaller than the first set value Pb1.

If the central controller 8 determines in step S41 that the rapid acceleration start control execution flag is not set or (even if the rapid acceleration start control execution flag is set) if the central controller 8 determines in step S46 that the vehicle speed VSP is equal to or larger than a motion start determination speed (i.e., that the vehicle has already started into motion) or determines in step S47 that the brake fluid pressure Pbrake is smaller than a non-braking determination value (i.e., that the brake device is not actuated), then the central controller 8 proceeds to step S48 and sets the rapid acceleration start control state flag to indicate that torque control of the engine is in progress.

Thus, if the central controller 8 determines in step S46 that the vehicle speed VSP is smaller than a motion start determination speed (i.e., that the vehicle is in a stopped state) or determines in step S47 that the brake fluid pressure Pbrake is equal to or larger than a non-braking determination value (i.e., that braking is in progress), then the central controller 8 ends the control loop of FIG. 6 so as to keep the rapid acceleration start control state flag at its current value (i.e., unchanged).

In step S50 of FIG. 2, the central controller 8 executes a rapid acceleration start control suspension determination to determine if the rapid acceleration start control should be suspended.

Figure 7:
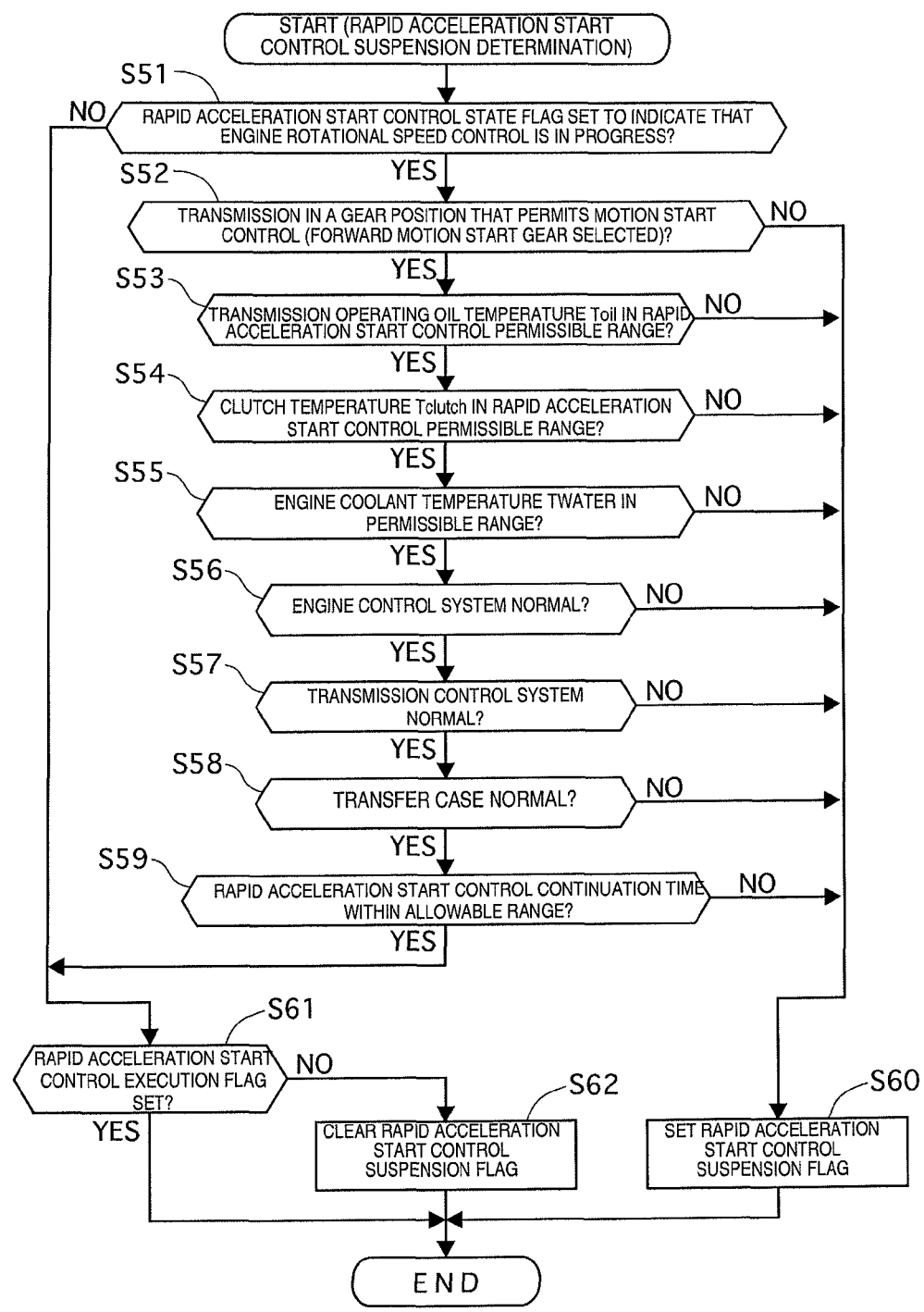
FIG. 7 is a flowchart showing a subroutine related to a rapid acceleration start control suspension determination step of the main routine shown in FIG. 2.

The rapid acceleration start control suspension determination is accomplished as shown in FIG. 7 by determining if the rapid acceleration start control should be suspended based on certain conditions that will now be explained.

In step S51, the central controller 8 checks if the rapid acceleration start control state flag set in the control loop of FIG. 6 indicates that rotational speed control of the engine is in progress. While the rapid acceleration start control state flag indicates that rotational speed control of the engine is in progress, the central controller 8 proceeds sequentially through steps S52 to S58.

In step S52, the central controller 8 checks if the selected gear is a rapid acceleration start control permissible gear position (forward motion start gear). In step S53 (which corresponds to a temperature monitoring section), the central controller 8 checks if the transmission operating oil temperature Toil is in a rapid acceleration start control permissible range, i.e., in a low temperature region where it is permissible to execute the rapid acceleration start control. In step S54 (which corresponds to a temperature monitoring section), the central controller 8 checks if the clutch temperature Tclutch is in a rapid acceleration start control permissible range (i.e., in a low temperature region where it is permissible to execute the rapid acceleration start control). In step S55 (which corresponds to a temperature monitoring section), the central controller 8 checks if the engine coolant temperature Twater is in a rapid acceleration start control permissible range (i.e., in a low temperature region where it is permissible to execute the rapid acceleration start control). In step S56, the central controller 8 checks if the engine control system is operating normally. In step S57, the central controller 8 checks if the transmission control system is operating normally. In step S58, the central controller 8 checks if the transfer case for four-wheel drive is operating normally. In step S59 (which corresponds to a timer section), the central controller 8 determines if the amount of time the rapid acceleration start control has continued is within an allowable range.

If the result of any of steps S52 to S59 is No, then the central controller 8 proceeds to step S60 (which corresponds to a rapid acceleration start control suspending section) and commands that the rapid acceleration start control be suspended by setting the rapid acceleration start control suspension flag.

However, if the results of all of steps S52 to S59 are Yes, then the central controller 8 proceeds to step S61 where it determines if the rapid acceleration start control execution flag is set. If not, the central controller 8 proceeds to step S62 where it clears the rapid acceleration start control suspension flag so as not to command suspension of the rapid acceleration start control.

The central controller 8 also arrives at step S61 when the rapid acceleration start control state flag is not set to indicate that rotational speed control of the engine is in progress, i.e., when torque control of the engine is progress. If it determines in step S61 that the rapid acceleration start control execution flag is set, then the central controller 8 ends the control loop of FIG. 7 so as to keep the rapid acceleration start control suspension flag at its current value (i.e., unchanged).

Figure 8:
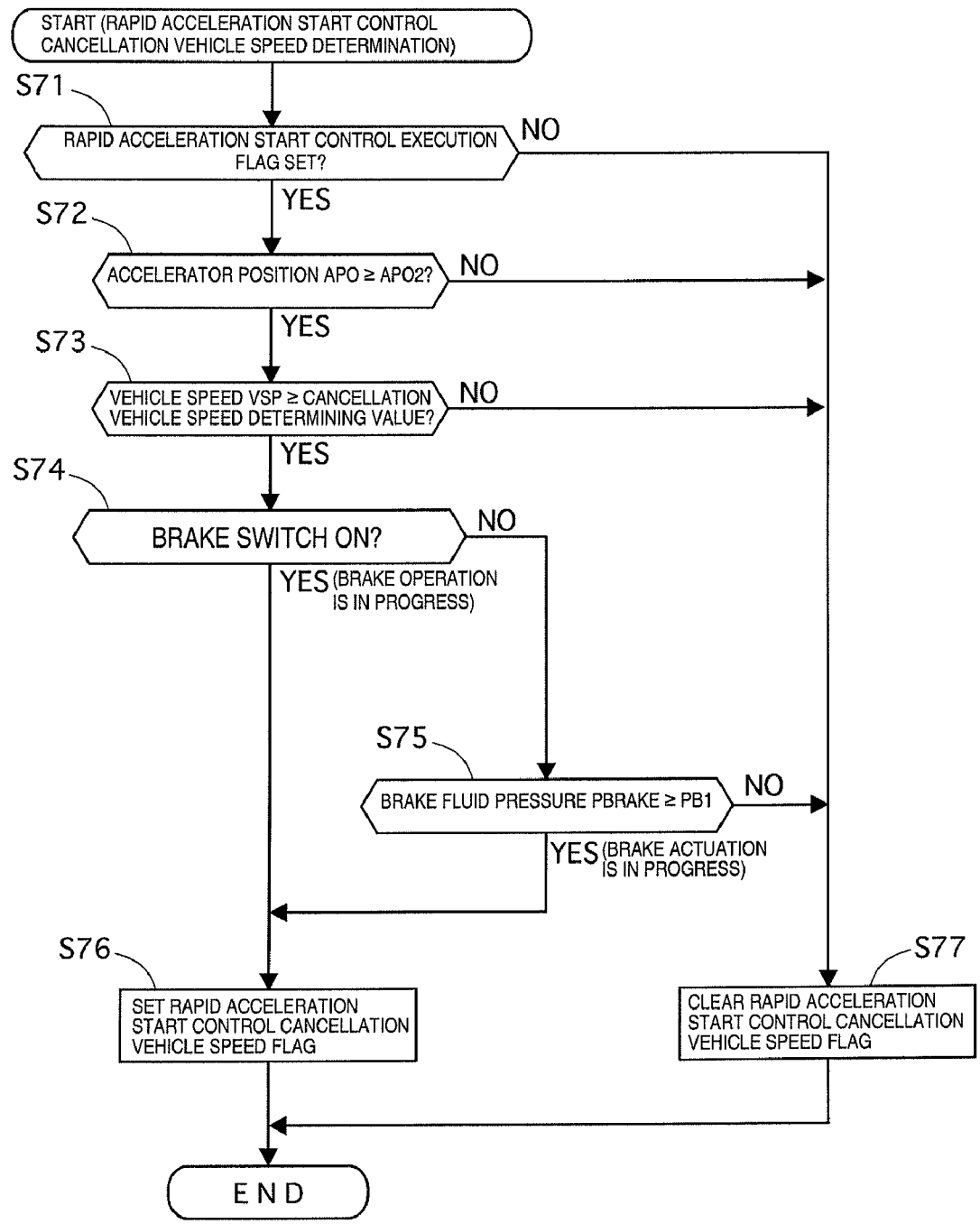
FIG. 8 is a flowchart showing a subroutine related to a rapid acceleration start control cancellation vehicle speed determination step of the main routine shown in FIG. 2.

In step S70 of FIG. 2, based on the control program shown in FIG. 8, the central controller 8 executes a rapid acceleration start control cancellation vehicle speed determination to determine if the vehicle has started moving such that the rapid acceleration start control should be cancelled even though a rapid acceleration start control request operation is being performed.

In step S71, the central controller 8 determines if the rapid acceleration start control execution flag is set. If so, the central controller 8 proceeds to steps S72 to S75.

In step S72, the central controller 8 determines if the accelerator position APO is equal to or larger than a second setting value APO2. In step S73, the central controller 8 determines if the vehicle speed is equal to or larger than a cancellation vehicle speed determination value (e.g., a vehicle speed value slightly higher than the stopped state determining vehicle speed). In step S74, the central controller 8 determines if the brake switch is ON, i.e., if a brake operation is being performed. In step S75, the central controller 8 determines if the brake fluid pressure Pbrake is equal to or larger than the first set value Pb1, indicating that braking is in progress.

If the results of all of steps S72 to S75 are Yes, or if the brake switch is determined to be OFF in step S74 but the brake fluid pressure Pbrake is determined to be equal to or larger than the first set value Pb1 (i.e., if braking is in progress) in step S75, then the central controller 8 proceeds to step S76 and sets a rapid acceleration start control cancellation vehicle speed flag.

Meanwhile, if the brake switch is determined to be OFF in step S74 and the brake fluid pressure Pbrake is determined not to be equal to or larger than the first set value Pb1 (i.e., if braking is not in progress) in step S75, then the central controller 8 executes step S77 in which the rapid acceleration start control cancellation vehicle speed flag is cleared. Then, the process ends the control loop of FIG. 8, and thereby keeps a rapid acceleration start control cancellation vehicle speed flag at its current value (unchanged).

Also, if the central controller 8 determines that the accelerator position APO is not equal to or larger than the second set value APO2 in step S72 or that the vehicle speed VSP is not equal to or larger than the cancellation vehicle speed determining value in step S73, then it clears the rapid acceleration start control cancellation vehicle speed flag in step S77 and ends the control loop of FIG. 8 so as to keep the rapid acceleration start control cancellation vehicle speed flag at its current value (unchanged).

If it determines in step S71 that the rapid acceleration start control execution flag is not set, then the central controller 8 proceeds to step S77 and clears the rapid acceleration start control cancellation vehicle speed flag and ends the control loop of FIG. 8 so as to keep the rapid acceleration start control cancellation vehicle speed flag at its current value (unchanged).

Step S80 of FIG. 2 corresponds to a rapid acceleration prime mover rotational speed control section. In step S80, a rapid acceleration start engine torque control is executed as indicated in the block diagram shown in FIG. 9.

A switch device 81 operates in response to the rapid acceleration start control suspension flag. When the rapid acceleration start control suspension flag is set, the switch device 81 assumes the switch position indicated with a broken line and outputs an engine torque upper limit value determined as a safety measure for use when rapid acceleration start control is suspended as an engine rotational speed feedback control upper limit torque for rapid acceleration starting. When the rapid acceleration start control suspension flag is cleared, the switch device 81 assumes the switch position indicated with a solid line and outputs a maximum engine torque corresponding to the accelerator position APO as the engine rotational speed feedback control upper limit torque for rapid acceleration starting, as indicated with a broken-line curve in FIG. 11.

Figure 9:
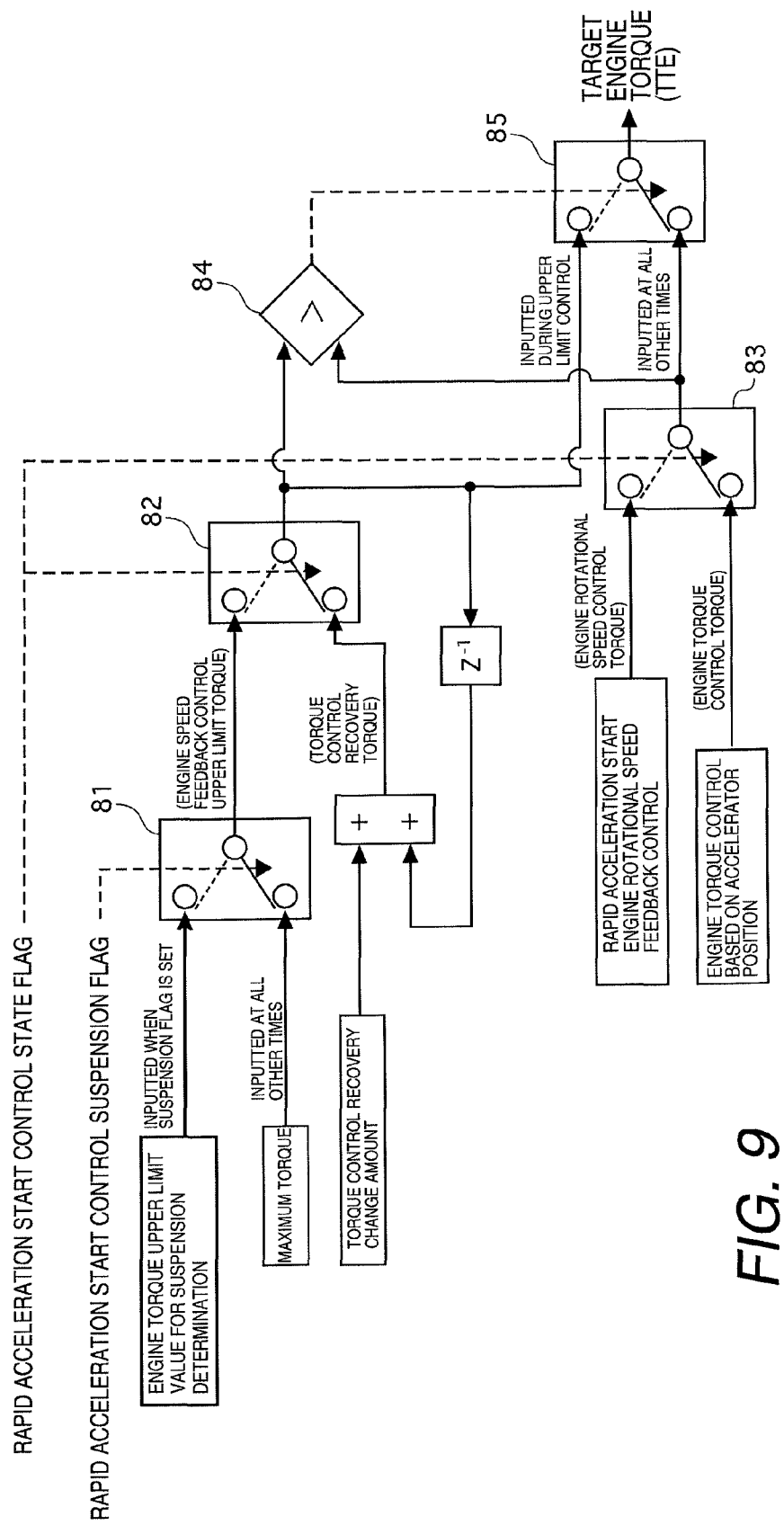
FIG. 9 is a function-specific block diagram related to the rapid acceleration start engine torque control step of the main routine shown in FIG. 2.

A switch device 82 is configured to assume a position indicated with a broken line in FIG. 9 when the rapid acceleration start control state flag is set to indicate that engine rotational speed control is in progress, i.e., that the engine rotational speed is being feedback controlled to achieve a prescribed rotational speed serving to accomplish a rapid acceleration start. In this position, the switch device 82 outputs the engine rotational speed feedback control upper limit torque for rapid acceleration starting from the switch device 81. Meanwhile, when the rapid acceleration start control state flag indicates that engine torque control is in progress, the switch device 82 changes to the position indicated with a solid line in FIG. 9 and outputs a torque control recovery engine torque.

The torque control recovery engine torque is a target engine torque used during a transitional period during which the central controller 8 is returning to a normal torque control from a rotational speed feedback control serving to adjust the engine rotational speed to a rotational speed suitable for accomplishing a rapid acceleration start. The torque control recovery engine torque can be calculated for each cycle by adding a per-cycle torque control recovery change amount to the output value of the switch device 82 in the previous cycle (indicated as $Z^{-1}$).

A switch device 83 is configured to assume a position indicated with a broken line in FIG. 9 when the rapid acceleration start control state flag is set to indicate that engine rotational speed is in progress. In this position, the switch device 83 outputs an engine rotational speed control torque calculated during an engine rotational speed feedback control executed to accomplish a rapid acceleration start. Meanwhile, when the rapid acceleration start control state flag indicates that engine torque control is in progress, the switch device 83 assumes the position indicated with a solid line in FIG. 9 and outputs an engine torque control torque calculated by an engine torque control in accordance with the accelerator position.

The engine rotational speed feedback control executed to accomplish a rapid acceleration start is an engine rotational speed feedback control configured to achieve a prescribed engine rotational speed (e.g., a fixed rotational speed of 4000 rpm) required to satisfy the rapid acceleration start request issued during a period when the vehicle is stopped and a rapid acceleration start request operation is being performed.

A comparator 84 serves to compare the outputs of the switch devices 82 and 83. When the output of the switch device 83 is larger than the output of the switch device 82 and it is necessary to limit the engine torque, a switch device 85 assumes a position indicated with a broken line in FIG. 9 and outputs the target engine torque tTe outputted from the switch device 82, thereby limiting the upper limit of the engine torque. When the output of the switch device 83 is not larger than the output of the switch device 82, the comparator 84 changes the switch device 85 to the position indicated with a solid line in the figure such that the switch device 85 outputs the target engine torque tTe outputted from the switch device 83, thereby limiting the upper limit of the engine torque.

Although not shown in FIG. 9, the target engine torque tTe can be achieved by converting the target engine torque tTe into a target throttle opening tTVO (see FIG. 1) and controlling the opening degree of the throttle valve 7 to match the target throttle opening tTVO.

Step S90 of FIG. 2 corresponds to a rapid acceleration start clutch capacity control section. In step S90, a rapid acceleration start clutch capacity control is executed as indicated in the block diagram shown in FIG. 10.

A switch device 91 is configured to operate in response to the rapid acceleration start execution flag. When the flag is set, the switch device 91 assumes a position indicated with a broken line in the figure and outputs a rapid acceleration start stall capacity coefficient as a stall waiting capacity coefficient of the starting clutch 2. When the rapid acceleration start execution flag is cleared, the switch device 91 assumes a position indicated with a solid line in the figure and outputs a normal stall capacity coefficient as the stall waiting capacity coefficient of the starting clutch 2.

A capacity coefficient is a factor that serves to determine a connection capacity of a clutch by being multiplied by the square of a engine rotational speed. The rapid acceleration start stall capacity coefficient is a connection capacity coefficient for the starting clutch 2 configured to calculate a connection capacity of the starting clutch 2 that serves to suppress the generation of heat in the starting clutch 2 during engine rotational feedback control for rapid acceleration start control.

More specifically, an instantaneous heat generation amount in a clutch (ΔJcl) is determined as a clutch differential rotational speed (Ne)×a clutch torque capacity (tTL)–a heat removal amount (Jo: a function of a lubricant flow rate), and a clutch temperature (Tcl) is determined as a time integral (Jcl) of the instantaneous heat generation amount in the clutch/a clutch heat capacity coefficient (kcl)+a clutch initial temperature (Tc10). The connection capacity coefficient of the starting clutch 2 is set to achieve a clutch connection capacity at which, for example, the clutch temperature (Tcl) does not exceed 300° C.

A switch device 92 is configured to operate in response to the rapid acceleration start control execution flag, the rapid acceleration start control suspension flag, and the rapid acceleration start control cancellation vehicle speed flag. The switch device 92 outputs a rapid acceleration start capacity coefficient as a motion start capacity coefficient for the starting clutch 2 when these flags indicate that the vehicle is starting into motion due to the rapid acceleration start control, and outputs a normal motion start capacity coefficient as the motion start capacity coefficient for the starting clutch 2 when the flags indicate that the vehicle is starting into motion normally and not due to rapid acceleration start control.

A switch device 93 is configured to operate in accordance with the rapid acceleration start control state flag. When the rapid acceleration start control state flag indicates that engine rotational speed control is in progress, the switch device 93 assumes a position indicated with a broken line in the figure and outputs the stall waiting capacity coefficient from the switch device 91. When the rapid acceleration start control state flag indicates that engine torque control is in progress, the switch device 93 assumes a position indicated with a solid line in FIG. 10 and outputs the motion start capacity coefficient from the switch device 92.

A switch device 94 is configured to operate in response to the rapid acceleration start control execution flag, the rapid acceleration start control suspension flag, and the rapid acceleration start control cancellation vehicle speed flag. The switch device 94 outputs a rapid acceleration start capacity coefficient change amount as a torque control transitional capacity coefficient change amount for the starting clutch 2 when these flags indicate that the vehicle is starting into motion due to the rapid acceleration start control, and outputs a normal motion start capacity coefficient change amount as a torque control transitional capacity coefficient change amount for the starting clutch 2 when the flags indicate that the vehicle is starting into motion normally and not due to rapid acceleration start control.

A comparator 95 serves to compare the capacity coefficient (rapid acceleration start capacity coefficient) from the switch device 93 to a torque control transitional capacity coefficient obtained by adding the torque control transitional capacity coefficient change amount from the switch device 94 to the previous-cycle value (indicated as $Z^{-1}$) of a final target torque capacity coefficient τ (described later) for the starting clutch 2 fed from a switch device 96.

When the torque control transitional capacity coefficient is larger than the capacity coefficient (rapid acceleration start capacity coefficient) from the switch 93, the switch device 96 assumes a position indicated with a broken line in the figure and outputs the capacity coefficient (rapid acceleration start capacity coefficient) from the switch device 93 as a target capacity coefficient τ, thereby preventing the torque control transitional capacity coefficient from exceeding the torque coefficient (rapid acceleration start torque coefficient) from the switch device 93.

When the torque control transitional capacity coefficient is not larger than the capacity coefficient (rapid acceleration start capacity coefficient) from the switch 93, the switch device 96 assumes a position indicated with a solid line in the figure and outputs the torque control transitional capacity coefficient as the target capacity coefficient τ, thereby not limiting the torque control transitional capacity coefficient in the manner just described. The target capacity coefficient τ determined as just described and the engine rotational speed Ne are used in the equation below to calculate the target clutch capacity tTL of the starting clutch 2.

$$tTL = \tau \times Ne^2$$

As shown in FIG. 1, the target clutch capacity tTL is fed as a command to the control valve body 6, instructing the control valve body 6 to control the starting clutch 2 such that the connection capacity thereof equals the target clutch capacity tTL.

The operational effects of a rapid acceleration start control in accordance with the present invention will now be explained based on FIG. 11, which depicts an example in which the vehicle is in a stopped state, i.e., the vehicle speed VSP is smaller than a stopped state determining vehicle speed, until a time t7.

At a time t1, a driver performs a brake operation and a brake fluid pressure Pbrake is generated. At a time t2, the brake fluid pressure Pbrake reaches a first set value Pb1 and the central controller 8 sets the rapid acceleration start control preparation flag.

The driver depresses the accelerator pedal and while keeping the vehicle stopped by operating the brake device; this constitutes a rapid acceleration start control request operation in which the accelerator position APO increases as shown in the figure. At a time t3, the accelerator position APO reaches a first set value APO1 and a stall region determination executed by the central controller 8 indicates that a stall region has been entered.

At a time t4, the accelerator position APO reaches a second set value APO2 and the central controller 8 sets the rapid acceleration start control execution flag. The central controller 8 also executes a rapid acceleration start stall region determination that indicates a rapid acceleration start stall region has been entered and starts to execute the rapid acceleration start control. In other words, the central controller 8 executes a rotational speed feedback control of the engine 3 as shown in FIG. 11 so as to achieve an engine speed that is required to accomplish the rapid acceleration start desired by the driver i.e., requested with the rapid acceleration start request operation performed while the vehicle was stopped due to a brake operation.

Since the vehicle is stopped, the engine rotational speed control causes a slippage amount of the starting clutch 2 to increase and, thus, an amount of heat generated in the motion starting clutch to become large. Consequently, there is the risk that the motion starting performance of the starting clutch 2 will decline. During engine rotational speed control executed to accomplish the rapid acceleration start, the connection capacity TL of the starting clutch 2 is lowered as shown in FIG. 11 so as to suppress the amount of heat generated in the starting clutch 2 as a result of the engine rotational speed control.

The driver decreases a brake operating force while keeping the accelerator position APO equal to or larger than the second set value APO2. At a time t5, the brake fluid pressure Pbrake becomes smaller than the second set value Pb2 and the rapid acceleration start control preparation flag is cleared. Then, at a time t6, the brake switch turns OFF and the brake fluid pressure Pbrake reaches 0. Also at the time t6, the central controller 8 ends the stall region determination and the rapid acceleration start stall determination. The engine rotational speed feedback control and the motion starting clutch capacity control executed for the rapid acceleration start are not ended immediately at the time t6 but, instead, are ended after a delay time ΔTd corresponding to a response delay of the engine 3 and the transmission 1 has elapsed. The engine torque Te, the engine rotational speed Ne, the motion starting clutch capacity coefficient τ, and the motion starting clutch transmittable torque capacity TL return to normal control values over time in a prescribed manner as shown in the figure.

A rapid acceleration control apparatus in accordance with this embodiment is contrived such that during a period when a driver performs a high-performance motion start control request operation by depressing an accelerator pedal and increasing an accelerator position APO while operating a brake so as to keep the vehicle in a stopped state, the rapid acceleration control apparatus execute a feedback control that keeps the engine rotational speed at a rapid acceleration start control rotational speed required to accomplish the rapid acceleration start request. As a result, when the stopped state of the vehicle is ended and the vehicle starts into motion, the motion start response corresponds to the rapid acceleration start request operation and is in accordance with the motion start response desired by the driver.

Although this engine rotational speed control causes the starting clutch 2 to generate heat due to slippage of the starting clutch 2 while the vehicle is stopped, the connection capacity of the starting clutch 2 is decreased so as to suppress the heat generation. As a result, a situation in which the starting clutch 2 fails due to heat and the motion starting performance of the vehicle declines can be avoided.

Also, a rapid acceleration control apparatus in accordance with this embodiment is configured to assume that a rapid acceleration start request operation has been performed and to start the rapid acceleration start engine rotational speed feedback control when the engine 3 has changed from a non-loaded state in which the accelerator position APO is 0 to a loaded state in which the accelerator position APO is equal to or larger than a value APO1 while the vehicle is stopped due to an actuation of a brake device. As a result, the rapid acceleration start engine rotational speed feedback control is started when the driver actually has performed a rapid acceleration start request operation and situations in which the rapid acceleration start engine rotational speed feedback control is started unnecessarily can be avoided.

The rapid acceleration control apparatus is further configured to assume that the brake device has changed from an actuated state to a non-actuated state when a signal (brake switch OFF signal) serving to detect if a driver has stopped performing an operation causing the brake device to be actuated and a signal serving to detect if an actuation amount of the brake device is at a level Pb2 indicating that the brake device is in a non-actuated state are both in an affirmative state. At such a time, the rapid acceleration control apparatus ends the rapid acceleration start engine rotational speed feedback control and executes a torque control of the engine 3 such that the engine torque changes toward a torque value corresponding to the accelerator pedal position APO (i.e., toward a value corresponding to the loaded state of the prime mover). At the same time, the rapid acceleration control apparatus ends a rapid acceleration start clutch capacity control and executes a capacity recovery configured to return the starting clutch 2 to a connection capacity corresponding to a transmitted torque of the engine 3. Thus, the rapid acceleration start control is ended is ended by issuing a command for ending the rapid acceleration start control when a brake operation cancellation signal and a brake non-actuated state signal are both affirmative. As a result, the rapid acceleration start control can be ended accurately.

Figure 10:
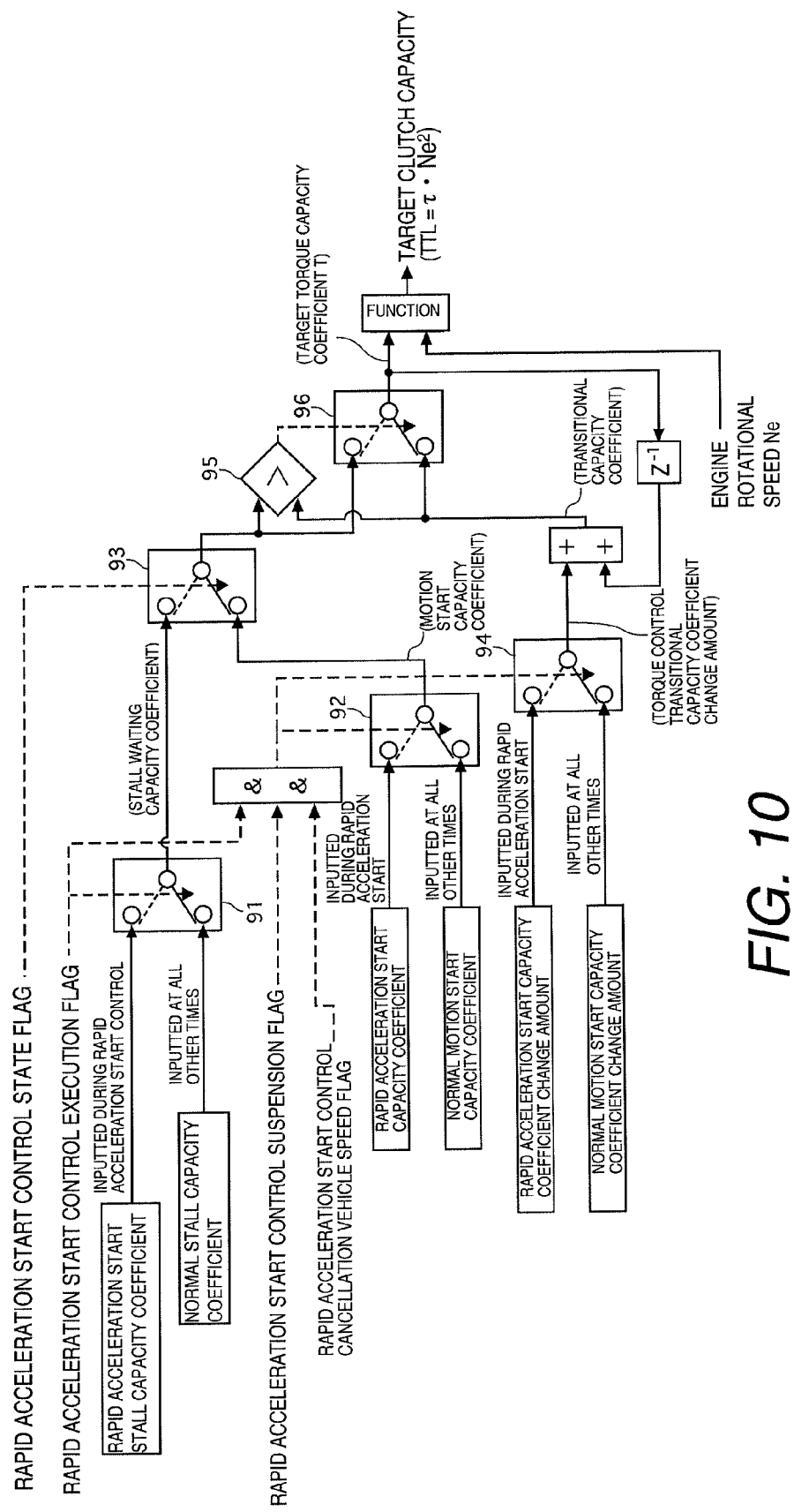
FIG. 10 is a function-specific block diagram related to the rapid acceleration start clutch capacity control step of the main routine shown in FIG. 2.

The rate at which the capacity recovery of the starting clutch 2 is executed is determined based on the rapid acceleration start capacity coefficient change amount shown in FIG. 10. The rapid acceleration start capacity coefficient change amount shown in FIG. 10 should be set such that the capacity of the start clutch 2 recovers at a rate indicated by the rapid acceleration start request operation. In this way, the motion start response requested by the driver through the rapid acceleration start request operation can be realized and a sense of satisfaction can be imparted to the driver.

In the embodiment, as explained previously based on FIG. 10, the capacity control of the starting clutch 2 is accomplished by manipulating the torque capacity coefficient τ. As a result, the capacity control of the starting clutch 2 can be accomplished more easily.

As explained previously with reference to FIG. 7, if the engine coolant temperature Twater, the temperature Tclutch of the starting clutch 2, and the transmission operating oil temperature Toil enter a temperature region in which the performance of the engine 3, the starting clutch 2, and the transmission 1 can not be maintained while the rapid acceleration start engine rotational speed feedback control and the rapid acceleration start clutch capacity control are being executed, or if the amount of time the rapid acceleration start engine rotational speed feedback control and the rapid acceleration start clutch capacity control have continued reaches a length beyond which the performance of the engine 3, the starting clutch 2, and the transmission 1 cannot be maintained, then a rapid acceleration start control suspension flag is set such that the rapid acceleration start engine rotational speed feedback control and the rapid acceleration start clutch capacity control are suspended. An example of such a situation occurs at a time t4' in FIG. 12, which is a time chart similar to FIG. 11. By suspending the rapid acceleration start engine rotational speed feedback control and the rapid acceleration start clutch capacity control when a state has been reached where the performance of the engine 3, the starting clutch 2, and the transmission 1 cannot be maintained, any harmful effects that would accompany the continued execution of these controls can be avoided.

Figure 12:
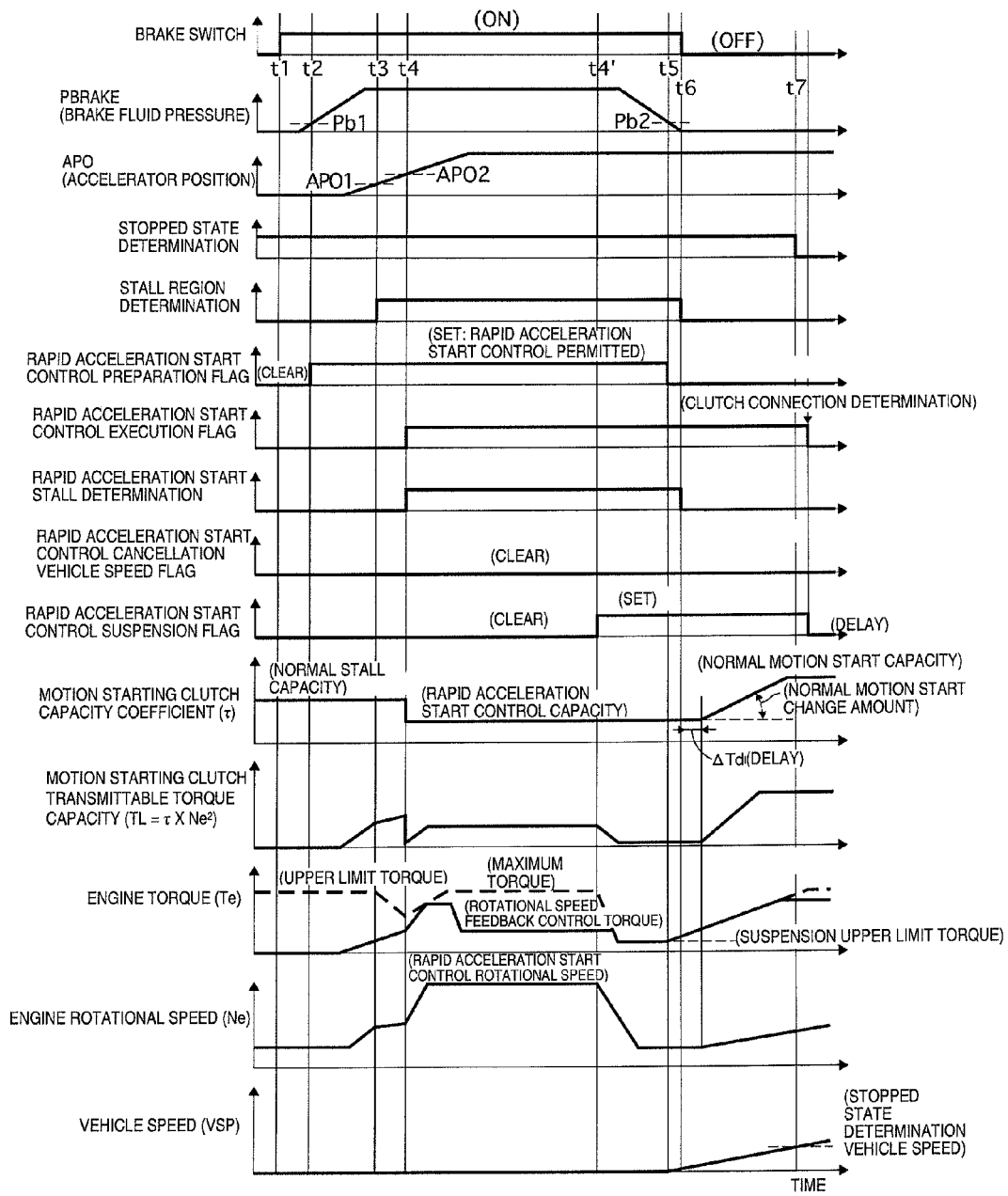
FIG. 12 is an operation time chart illustrating an example of the operation of the rapid acceleration start control presented in FIGS. 2 to 9 during an abnormal situation.

As shown in FIG. 12, the engine torque Tc is limited to a suspension upper limit torque as a safety measure (discussed previously regarding FIG. 9) for a period starting at the time t4' during the suspension of the rapid acceleration start control. As a result, a situation in which the engine rotational speed Ne, too, declines, the transmittable torque capacity Te of the starting clutch 2 declines in response, and the performance of the transmission 1 becomes unsustainable can be avoided.

After the time t4', the driver decreases a brake operating force while keeping the accelerator position APO equal to or larger than the second set value APO2. At a time t5, the brake fluid pressure Pbrake becomes smaller than the second set value Pb2 and the rapid acceleration start control preparation flag is cleared. Then, at a time t6, the brake switch turns OFF and the brake fluid pressure Pbrake reaches 0. Also at the time t6, the central controller 8 ends the stall region determination and the rapid acceleration start stall determination. The engine torque limiting control and the motion starting clutch capacity control executed during the suspension of the rapid acceleration start control are not ended immediately at the time t6 but, instead, are ended after a delay time ΔTd corresponding to a response delay of the engine 3 and the transmission 1 has elapsed. The engine torque Te, the engine rotational speed Ne, the motion starting clutch capacity coefficient τ, and the motion starting clutch transmittable torque capacity TL return to normal control values over time in a prescribed manner as shown in the figure.

As explained previously with reference to FIG. 8, if it determines that the accelerator position APO is equal to or larger than the second set value APO2, the vehicle speed VSP is equal to or larger than the cancellation vehicle speed determining value, and the brake switch is ON due to a brake operation being performed, or if the brake switch is not ON but the brake fluid pressure Pbrake is equal to or larger than the first set value Pb1 indicating that the brake device is in an actuated state, then in step S76 the central controller 8 sets the rapid acceleration start control cancellation vehicle speed flag and aborts the rapid acceleration start control. The execution of step S76 corresponds to a time t7 shown in FIG. 13, which is an operation time chart similar to FIG. 11.

Figure 13:
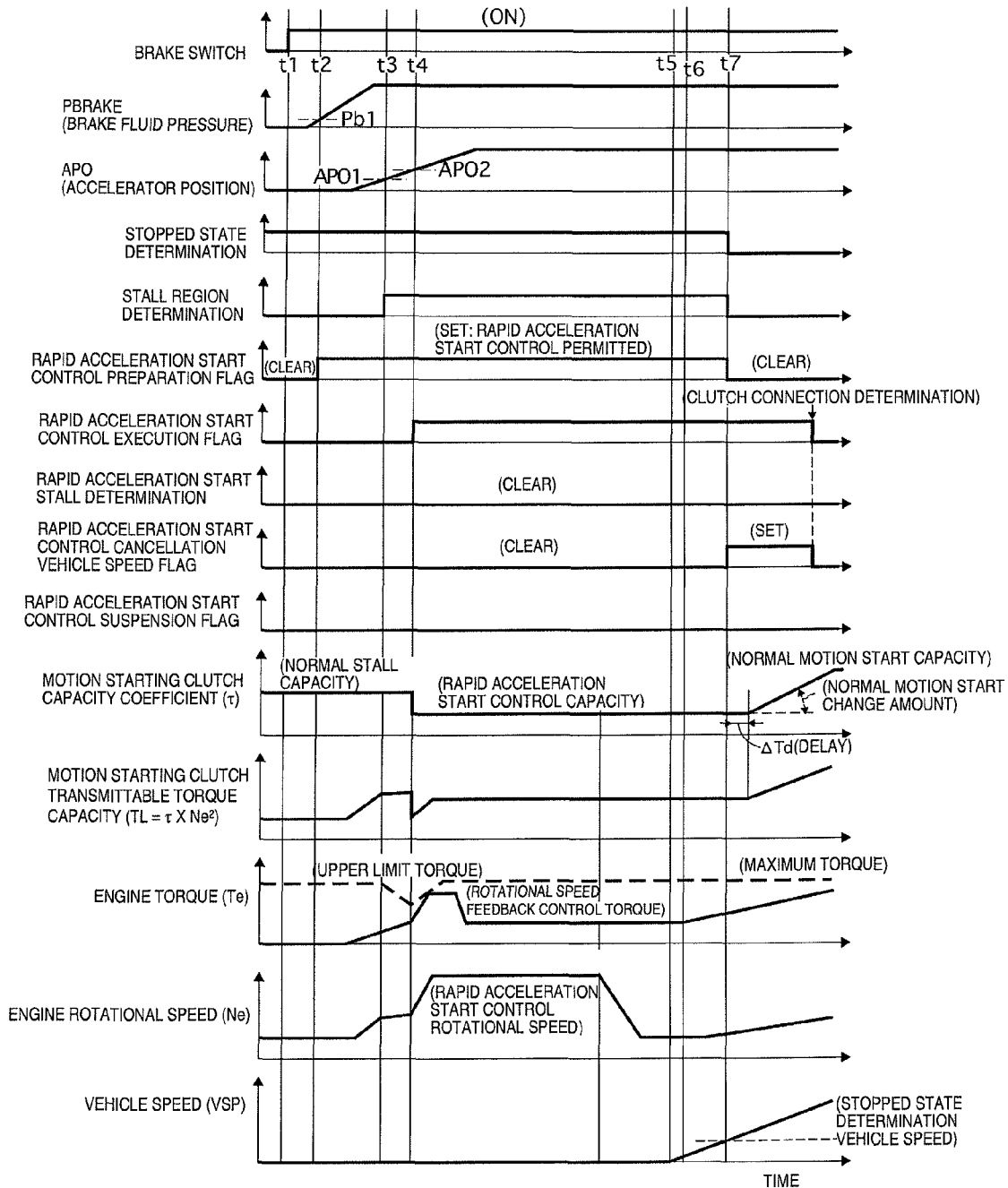
FIG. 13 is an operation time chart illustrating an example of the operation of the rapid acceleration start control presented in FIGS. 2 to 9 in a situation where the vehicle reaches a cancellation vehicle speed.

More specifically, at the time t7 in FIG. 13, the central controller 8 executes a stopped state determination, clears the stall region determination, determines that the vehicle is not in the stall region, and clears the rapid acceleration start control preparation flag. The engine control and the motion starting clutch capacity control executed for the rapid acceleration start are not ended immediately at the time t7 but, instead, are ended after a delay time ΔTd corresponding to a response delay of the engine 3 and the transmission 1 has elapsed. The engine torque Te, the engine rotational speed Ne, the motion starting clutch capacity coefficient T, and the motion starting clutch transmittable torque capacity TL return to normal control values over time in a prescribed manner as shown in the figure.

Thus, if the rapid acceleration start control request operation continues even though the vehicle has started moving, then the rapid acceleration start control is aborted such that any harmful effects that might result from continuing the rapid acceleration start control after the vehicle has started moving can be avoided.

In the illustrated embodiment, when a rapid acceleration start operation is being performed with the vehicle in a stopped state, the control apparatus executes a rotational speed control of the engine 3 (e.g., a prime mover) that obtains a rotational speed that is appropriate for achieving the motion starting response requested by the rapid acceleration start operation. This is different from the conventional engine control, in which a torque control is executed so as to increase the drive force outputted by the prime mover in accordance with the operation of the accelerator. Additionally, in the illustrated embodiment, a torque capacity control is executed with respect to the starting clutch 2 such that the rotational speed control of the engine 3 does not cause a heat generation problem in the starting clutch 2. Although this prime mover rotational speed control causes the starting clutch 2 to generate heat due to slippage of the starting clutch 2 while the vehicle is stopped, the connection capacity of the starting clutch 2 is decreased so as to suppress the heat generation. As a result, a situation in which the starting clutch 2 fails due to heat and affects the ability of the vehicle to start into motion can be avoided.

General Interpretations of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, although the transmission having a capacity-controllable motion starting clutch shown in the figures and discussed in the embodiment is an automatic manual transmission 1, the present invention is intended to provide the same operational effects when applied to a continuously variable transmission or a step-type automatic transmission using a planetary gear set, so long as the transmission has a capacity-controllable motion starting clutch. Also components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rapid acceleration control apparatus for a vehicle, comprising:
   a prime mover rotational speed control section configured to control a rotational speed of a prime mover;
   a clutch connection capacity control section configured to control connection capacity of a clutch arranged between the prime mover and a wheel;
   a rapid acceleration request determining section configured to determine a rapid acceleration start condition exists when both an accelerator and a brake are simultaneously operated while the vehicle is stopped;
   a rapid acceleration prime mover rotational speed control section configured to execute a rapid acceleration start prime mover rotational speed control that control a rotational speed of the prime mover to a target rotational speed required to achieve the rapid acceleration start when the rapid acceleration request determining section has determined that the rapid acceleration start condition exists; and a rapid acceleration start clutch capacity control section configured to execute a rapid acceleration start clutch capacity control that decreases a connection capacity of the clutch during the rapid acceleration start prime mover rotational speed control executed by the rapid acceleration prime mover rotational speed control section to suppress heating of the clutch due to the rapid acceleration start primer mover rotational speed control.

2. The rapid acceleration control apparatus as recited in claim 1, wherein
the rapid acceleration prime mover rotational speed control section is further configured to start the rapid acceleration start prime mover rotational speed control when the prime mover has changed from a non-loaded state to a loaded state while the vehicle is stopped due to an actuation of the brake.

3. The rapid acceleration control apparatus as recited in claim 2, wherein
the rapid acceleration prime mover rotational speed control section is further configured to end the rapid acceleration start prime mover rotational speed control and execute a torque control with respect to the prime mover when the brake changes from an actuated state to a non-actuated state, such that a torque of the prime mover changes toward a target torque value corresponding to the loaded state of the prime mover; and
the rapid acceleration start clutch capacity control section is further configured to end the rapid acceleration start clutch capacity control and execute a capacity recovery control that returns the connection capacity of the clutch so as to correspond to a transmitted torque when the brake changes from the actuated state to the non-actuated state.

4. The rapid acceleration control apparatus as recited in claim 3, wherein
the rapid acceleration prime mover rotational speed control section is further configured to determine that the brake has changed from the actuated state to the non-actuated state upon receiving both a signal indicative of a driver brake releasing operation and a signal indicative of an actuation amount of the brake being at a level indicating that the brake is in the non-actuated state.

5. The rapid acceleration control apparatus as recited in claim 3, wherein
the rapid acceleration start clutch capacity control section is further configured to execute the capacity recovery control at a rate in accordance with in the operation of the accelerator.

6. The rapid acceleration control apparatus as recited in claim 1, wherein
the rapid acceleration prime mover rotational speed control section is further configured to start the rapid acceleration start prime mover rotational speed control when the prime mover has changed from a non-loaded state to a loaded state in which a load of the loaded state is equal to or larger than a prescribed value while the vehicle is stopped due to an actuation of the brake.

7. The rapid acceleration control apparatus as recited in claim 1, wherein
the rapid acceleration start clutch capacity control section is further configured to control the connection capacity of the clutch by manipulating a torque capacity coefficient.

8. The rapid acceleration control apparatus as recited in claim 1, further comprising:
a temperature monitoring section configured to monitor a prime mover temperature, a clutch temperature, and a transmission temperature during a period in which the rapid acceleration prime mover rotational speed control section is executing the rapid acceleration start prime mover rotational speed control and the rapid acceleration start clutch capacity control section is executing rapid acceleration start clutch capacity control; and
a first rapid acceleration start control suspending section configured to suspend the rapid acceleration start prime mover rotational speed control executed by the rapid acceleration prime mover rotational speed control section and the rapid acceleration start clutch capacity control executed by the rapid acceleration start clutch capacity control section when at least one of the temperatures monitored by the temperature monitoring section enter a prescribed temperature region indicative that a prescribed performance level cannot be maintained.

9. The rapid acceleration control apparatus as recited in claim 8, further comprising:
a timer section configured to measure a rapid acceleration start control time indicating an amount of time that the rapid acceleration start prime mover rotational speed control executed by the rapid acceleration prime mover rotational speed control section and the rapid acceleration start clutch capacity control executed by the rapid acceleration start clutch capacity control section have been continuously executed; and
a second rapid acceleration start control suspending section configured to suspend the rapid acceleration start prime mover rotational speed control executed by the rapid acceleration prime mover rotational speed control section and the rapid acceleration start clutch capacity control executed by the rapid acceleration start clutch capacity control section when the rapid acceleration start control time measured by the timer section reaches a prescribed amount of time beyond which a prescribed performance level cannot be maintained.

10. The rapid acceleration control apparatus as recited in claim 9, wherein
the first and second rapid acceleration start control suspending sections are further configured to set an upper limit value with respect to a torque of the prime mover and to execute control to prevent the torque of the prime mover from exceeding the upper limit value when the rapid acceleration start prime mover rotational speed control executed by the rapid acceleration prime mover rotational speed control section and the rapid acceleration start clutch capacity control executed by the rapid acceleration start clutch capacity control section are suspended.

* * * * *